(12) United States Patent
Yang

(10) Patent No.: US 6,651,489 B1
(45) Date of Patent: Nov. 25, 2003

(54) DRIVING FORCE DETECTING DEVICE FOR CYCLES

(76) Inventor: Morgan Yang, P.O. Box 63-298, Taichung (TW), 406

( * ) Notice: Subject to any disclaimer, the term of this patent is extended or adjusted under 35 U.S.C. 154(b) by 0 days.

(21) Appl. No.: 10/172,517

(22) Filed: Jun. 12, 2002

(51) Int. Cl.$^7$ ................................................. G01L 3/26
(52) U.S. Cl. ................................... 73/117.2; 73/862.08
(58) Field of Search ........................... 73/862.08, 117.2; 341/11; 33/1; 324/207

(56) References Cited

U.S. PATENT DOCUMENTS

| | | | | |
|---|---|---|---|---|
| 3,786,336 A | * | 1/1974 | Lohr | 322/51 |
| 3,827,335 A | * | 8/1974 | Lewis et al. | 91/3 |
| 3,982,106 A | * | 9/1976 | Stutz | 377/3 |
| 4,558,611 A | * | 12/1985 | Boffelli | 74/826 |
| 4,676,331 A | * | 6/1987 | Iwaki et al. | 180/444 |
| 4,691,192 A | * | 9/1987 | Baker | 341/11 |
| 4,752,732 A | * | 6/1988 | Van Schoiack et al. | 324/207.18 |
| 5,353,635 A | * | 10/1994 | Saiki et al. | 73/117.2 |
| 5,694,042 A | * | 12/1997 | Eaton et al. | 324/207.22 |
| 5,763,793 A | * | 6/1998 | Ng et al. | 73/862.326 |
| 6,298,566 B1 | * | 10/2001 | Endo et al. | 33/1 PT |
| 6,360,841 B1 | * | 3/2002 | Blandino et al. | 180/443 |
| 6,492,911 B1 | * | 12/2002 | Netzer | 340/870.37 |

* cited by examiner

*Primary Examiner*—Edward Lefkowitz
*Assistant Examiner*—Andre Allen

(57) ABSTRACT

A detecting device for a cycle includes a sprocket rotatably secured on a shaft, the shaft has an actuator for actuating the sprocket to rotate relative to the shaft. A device may be used for detecting the angular displacement between the shaft and the sprocket, in order to obtain or to calculate the power and the energy and the torque required to rotate the shaft and to drive the cycle. The motor device for driving the cycle may be actuated with less energy while moving down hill. A greater energy may be applied to the motor device while climbing up the hill.

6 Claims, 7 Drawing Sheets

DRIVING FORCE DETECTING DEVICE FOR CYCLES

BACKGROUND OF THE INVENTION

1. Field of the Invention

The present invention relates to a detecting device, and more particularly to a detecting device for detecting the driving force or the driving torque required for the cycles.

2. Description of the Prior Art

Typical cycles, particularly the motorized cycles, comprise a motor device for driving the cycles. While riding the cycles, the forces or the torques applied onto the cycles in order to drive the cycles may be different due to different road conditions. For example, while riding down hill, the motor device is required to apply a less force against the cycles; and while climbing up a hill, it may take a great energy to actuate the motor device in order to drive the cycles up the hill. However, the motor device may not be suitably controlled to apply different forces or torques against the cycles.

The present invention has arisen to mitigate and/or obviate the afore-described disadvantages of the conventional detecting devices.

SUMMARY OF THE INVENTION

The primary objective of the present invention is to provide a detecting device for detecting the driving force or the driving torque required for driving the cycles.

In accordance with one aspect of the invention, there is provided a detecting device for a cycle, the detecting device comprising a shaft, a sprocket rotatably secured onto the shaft, the shaft including means for actuating the sprocket to rotate relative to the shaft, and means for detecting an angular displacement between the shaft and the sprocket. The power or the energy or the torque required to be applied onto the shaft in order to drive the cycle may then be obtained or calculated from the obtained or detected signals, and may be used to energize or to actuate the motor device in order to suitably drive the cycle in response to different road conditions. For example, a less energy may be consumed to actuate the motor device while moving down hill, and a greater energy may be applied to the motor device while climbing up the hill.

The actuating means includes an actuator rotatably and unidirectionally secured on the shaft, and engageable with the sprocket for rotating the sprocket relative to the shaft.

The sprocket includes a cavity formed therein for receiving the actuator. A spring may further be provided and engaged between the actuator and the sprocket.

The detecting means includes a first sensor disposed on the sprocket, and a second sensor attached to the shaft. The shaft may include a follower secured thereon for supporting the second sensor.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
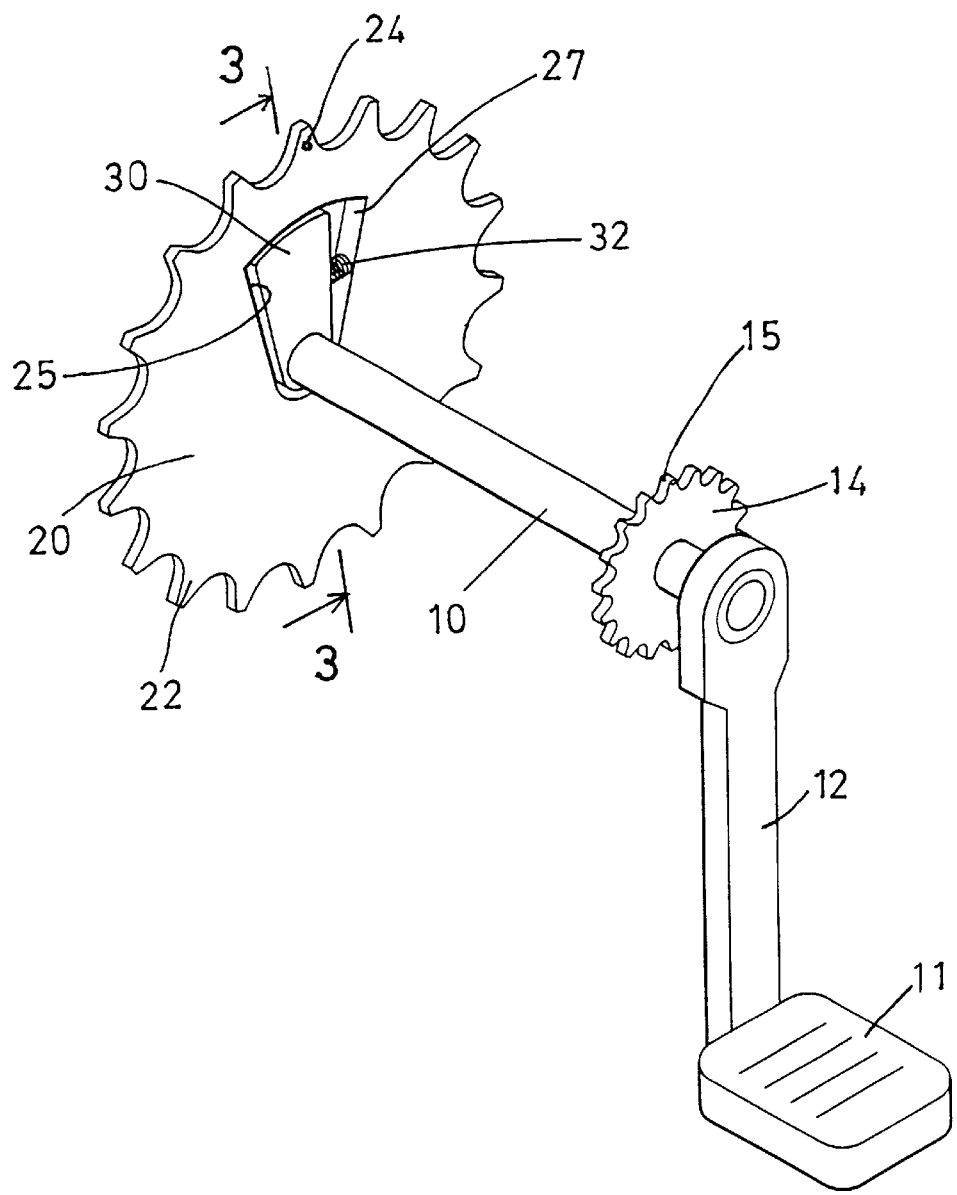
FIG. 1 is a partial perspective view of a cycle having a detecting device in accordance with the present invention.
Figure 2:
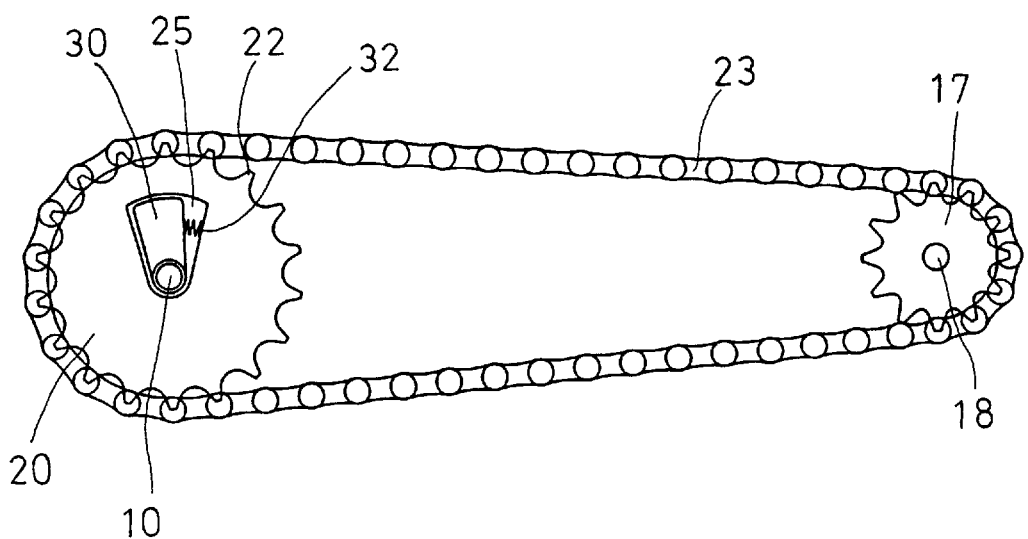
FIG. 2 is a partial plan view illustrating the detecting device for the cycle.
Figure 3:
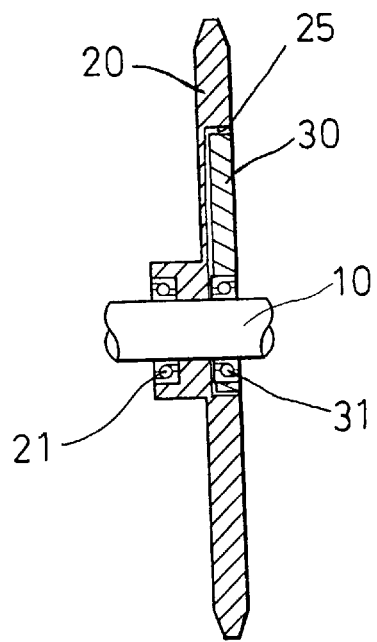
FIG. 3 is a partial cross sectional view taken along lines 3—3 of FIG. 1.

Referring to the drawings, and initially to FIGS. 1–4, a detecting device in accordance with the present invention is primarily provided for detecting the driving forces or the driving torques required to drive the cycles. The cycle or the detecting device comprises a shaft 10, a pair of foot pedals 11 coupled to the ends of the shaft 10 with a pair of typical cranks 12 respectively, for driving and rotating the shaft 10 with the typical cycling exercises or operations. The motorized cycle may further include a motor device (not shown) coupled to the shaft 10 in order to rotate the shaft 10.

A follower 14, such as a gear wheel 14 is secured on the shaft 10 and rotated in concert with the shaft 10. A detector or a sensor 15, such as a magnet or the like, is attached onto the follower 14. The cycle includes a sprocket 17 secured to a rear wheel axle 18 with one or more typical unidirectional bearings (not shown), for allowing the sprocket 17 to be rotated relative to the rear wheel axle 18 in one direction only.

A sprocket 20 is rotatably secured onto the shaft 10 with one or more bearings 21 (FIG. 3), for allowing the sprocket 20 to be rotated relative to the shaft 10. The sprocket 20 includes a number of teeth 22 formed or provided on the outer peripheral portion thereof. A chain 23 (FIG. 2) is engaged around the sprockets 17, 20 for rotating the rear wheel axle 18 to drive the cycle. A detector or a sensor 24, such as a magnet or the like, is attached onto the sprocket 20.

The sprocket 20 includes a cavity 25 formed therein. An actuator 30 is received in the cavity 25 of the sprocket 20 and is rotatably secured onto the shaft 10 with one or more typical unidirectional bearings 31 (FIG. 3), for allowing the actuator 30 to be rotated and driven forward or in an active direction, relative to the shaft 10 by the foot pedals 11. A spring 32 is disposed and engaged between the actuator 30 and an actuating surface 27 of the sprocket 20. Alternatively, the sensor 15 may be attached to the actuator 30 instead of being attached to the follower 14.

Figure 8:
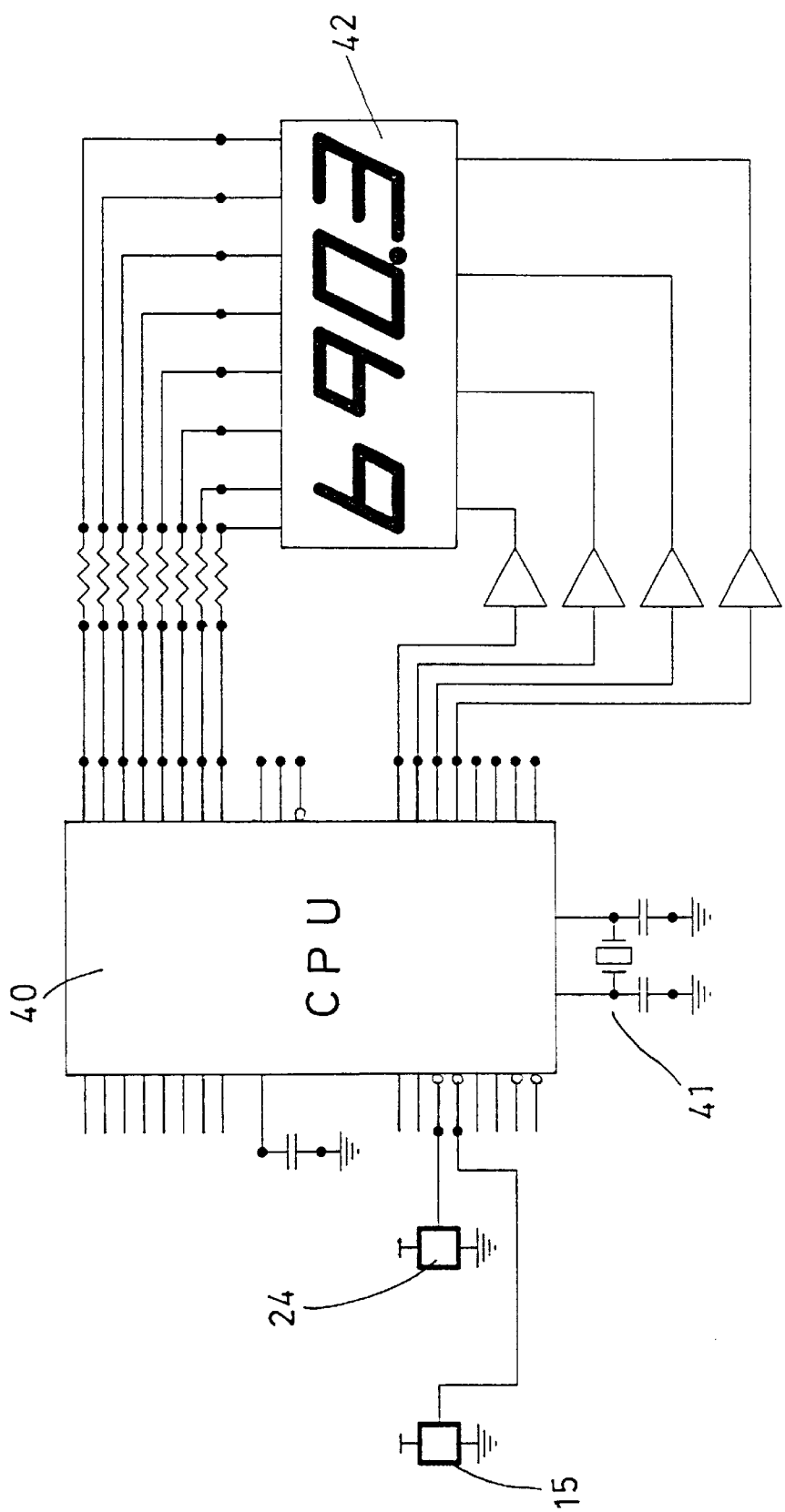
FIG. 8 is a schematic view illustrating the electric circuit of the detecting device.

As shown in FIG. 8, the detecting device includes a processor device 40 coupled to a displayer 42. The sensors 15, 24 are coupled to the processor device 40 for sending the detected signals to the processor device 40. An oscillator 41 is coupled to the processor device 40 for supplying a precision time-based signal to the processor device 40.

Figure 4:
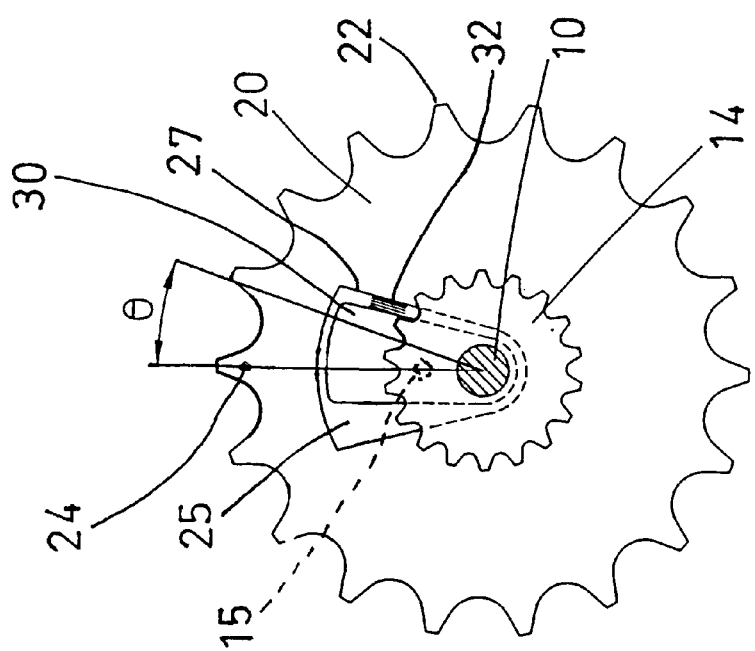
FIG. 4 is an enlarged partial plan view illustrating the detecting device for the cycle.
Figure 6:
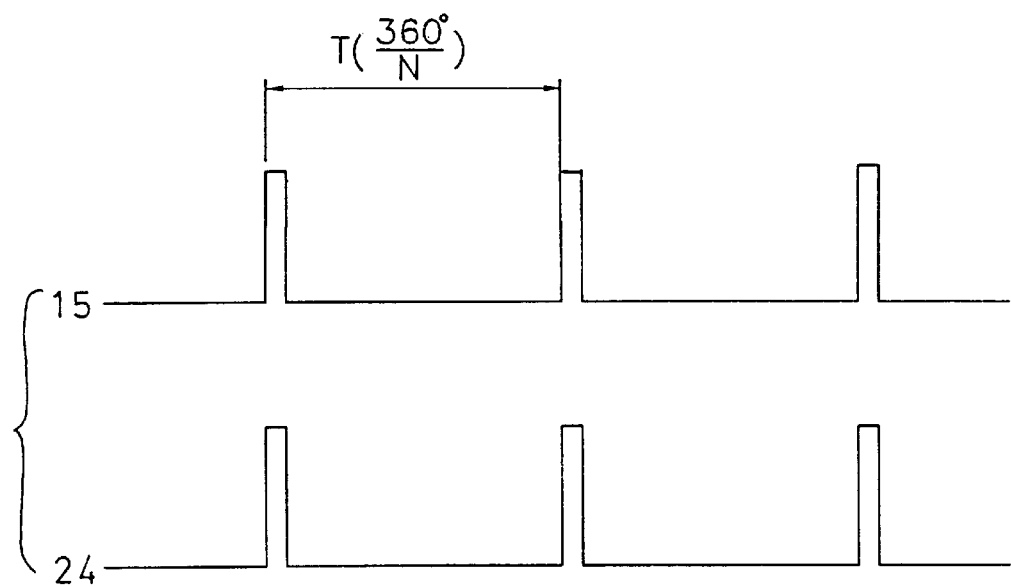
FIGS. 6 and 7 are schematic views illustrating the signals detected by the detecting device for the cycle.

In operation, as shown in FIG. 4, when the foot pedals 11 have not apply a force against the shaft 10, the actuator 30 will not force against the sprocket 20, and the spring 32 may bias the actuator 30 away from the actuating surface 27 of the sprocket 20. At this moment, the sensors 15, 24 are aligned with each other, such that the signals, such as the pulse signals, send out of the sensors 15, 24 may also be aligned with each other (FIG. 6).

Figure 5:
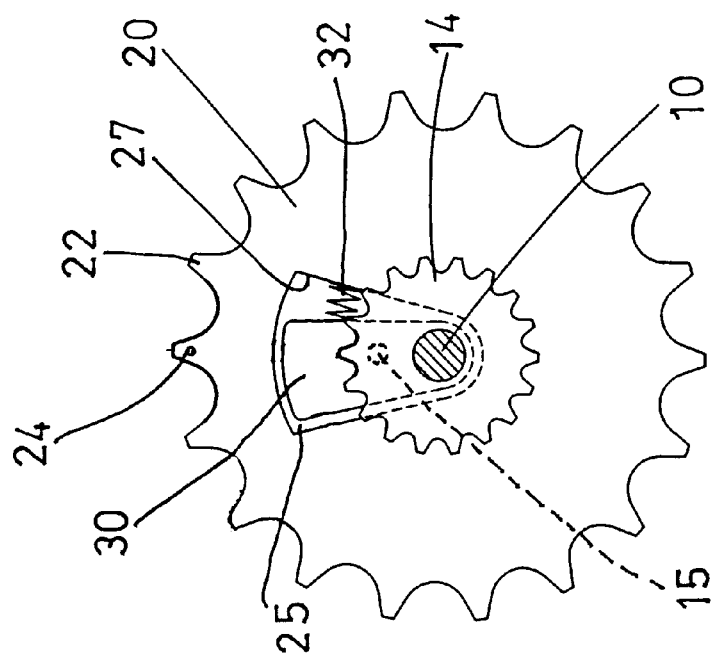
FIG. 5 is an enlarged partial plan view similar to FIG. 4, illustrating the operation of the detecting device for the cycle.
Figure 7:
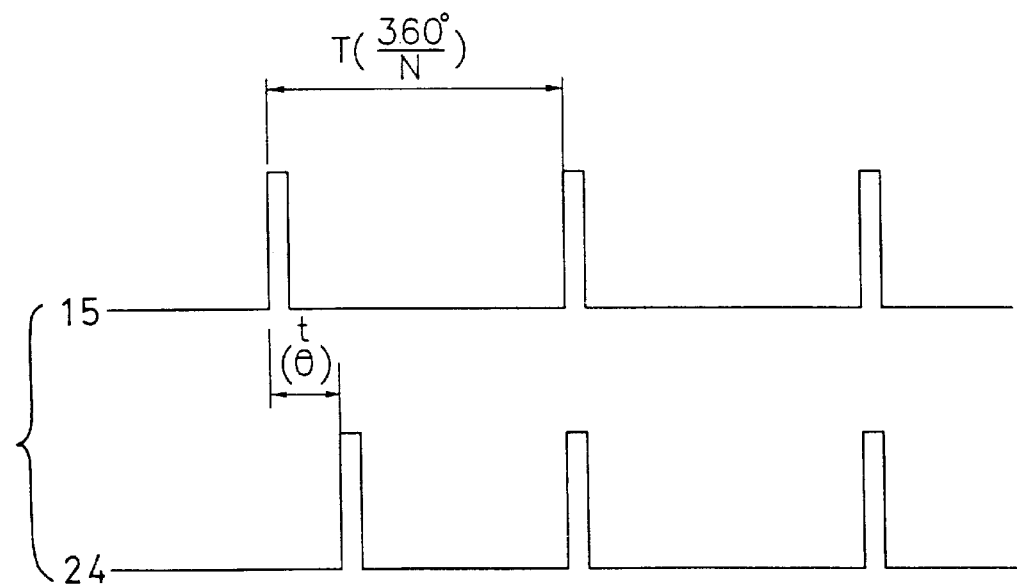

As shown in FIG. 5, when the foot pedals 11 applies a force against the shaft 10, the actuator 30 will be forced and rotated toward the actuating surface 27 of the sprocket 20, and the spring 32 may be compressed by and between the actuator 30 and the actuating surface 27 of the sprocket 20. At this moment, the sensors 15, 24 disposed on the follower 14 and the sprocket 20 are offset from each other for an angular displacement θ, such that the signals, such as the pulse signals, send out of the sensors 15, 24 may also be offset from each other (FIG. 7) for a time interval "t" that corresponds to the angular displacement θ between the sensors 15, 24.

The signals from the sensors 15, 24 may then be sent to the processor device 40 and treated or or calculated or processed by the processor device 40. The angular displacement θ may also be obtained or determined between the shaft 10 and the sprocket 20; and/or between the actuator 30 and the sprocket 20; and/or between the follower 14 and the sprocket 20.

Figure 9:
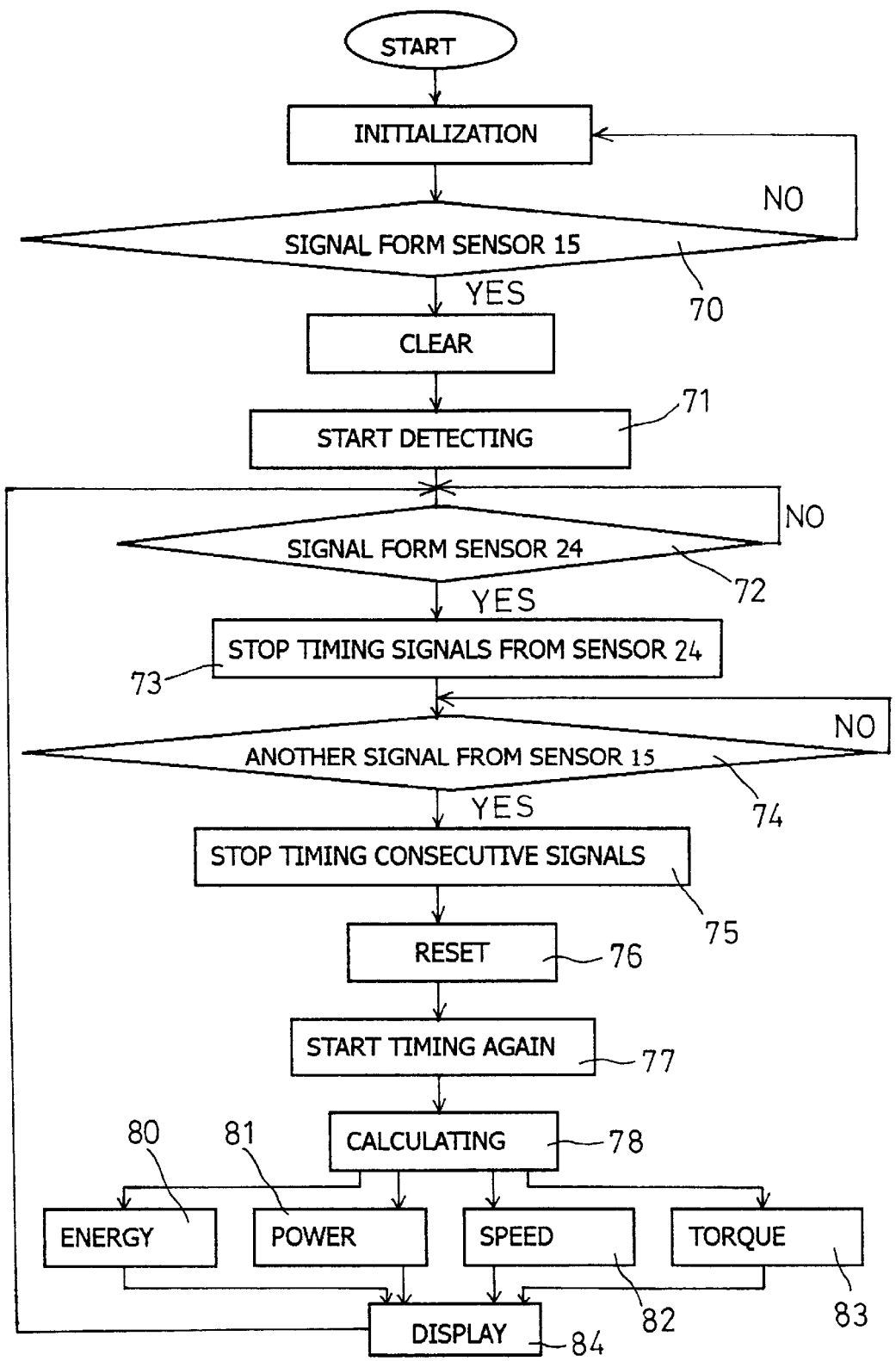
FIG. 9 is a flow chart illustrating the operation of the detecting device for the cycle.

Referring next to FIG. 9, in operation, when the shaft 10 has been rotated by the foot pedals 11, the sensor 15 may sent a signal to the processor device 40, and the processor device 40 may detect whether the signal from the sensor 15 has been suitably sent to the processor device 40 or not at process 70. The signal from the sensor 15 may actuate or cause the processor device 40 to start detecting the other signals at process 71.

The processor device 40 may then detect whether the signal from the sensor 24 has been suitably sent to the processor device 40 or not at process 72. When the signal from the sensor 24 has been suitably sent to the processor device 40, the time interval "t" between the signals from the sensors 15, 24 may be obtained or calculated by the processor device 40. After the time interval "t" between the signals from the sensors 15, 24 has been obtained, the processor device 40 may stop timing or detecting the signals from the sensor 24 at process 73.

When the other signal from the sensor 15 has been sent to the processor device 40 at process 74, the processor device 40 may then stop timing or detecting the signals from the sensor 15 at process 75, and may calculate the time interval "T" (FIGS. 6, 7) between the two consecutive signals from the sensor 15. The time interval "T" equals to 360°/N, in which N equals to the number of the teeth 22 of the sprocket 20.

After the time intervals "t" and "T" have been obtained, the timing of the signals may be reset at process 76, and may be started again at process 77. The torque "Q", for example, may then be obtained or calculated with the following equation: Q=(t/T)×k, in which k is the torque constant and may be different form sprockets 20 to sprockets 20.

For example, the processor device 40 may then calculate the required values at process 78. For example, the energy (80) and/or the power (81) and/or the torque (83) required for rotating or driving the shaft 10 and the cycle may be calculated, and/or the rotational speed of the shaft 10 (82) and the sprocket 20 and/or the moving speed of the cycle may also be calculated and obtained. The values of the energy and/or the power and/or the torque and/or the speed may then be displayed in the displayer 42 (FIG. 8) at process 84.

After the required values have been obtained, the processor device 40 may then determine the conditions required to rotate or to drive the cycle. For example, while riding down hill, the processor device 40 may apply a less energy or power to the motor device. On the contrary, while climbing up a hill, the processor device 40 may apply a greater energy or power to the motor device, in order to suitably actuate the motor device and so as to suitably drive and move the cycle up the hill.

Figure 10:
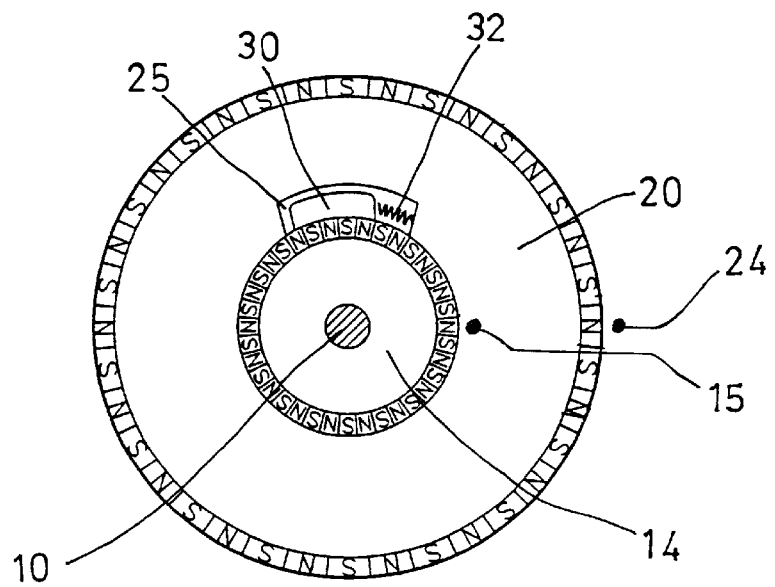
FIGS. 10, 11 are enlarged partial plan views similar to FIGS. 4 and 5, illustrating the other embodiments of the detecting device for the cycle.

Alternatively, as shown in FIG. 10, the follower 14 and the sprocket 20 may each include a number of magnets or sensors 15, 24 provided on or around the outer peripheral portion thereof for allowing the angular displacement between the follower 14 and the sprocket 20 to be detected and sent to the processor device 40.

Figure 11:
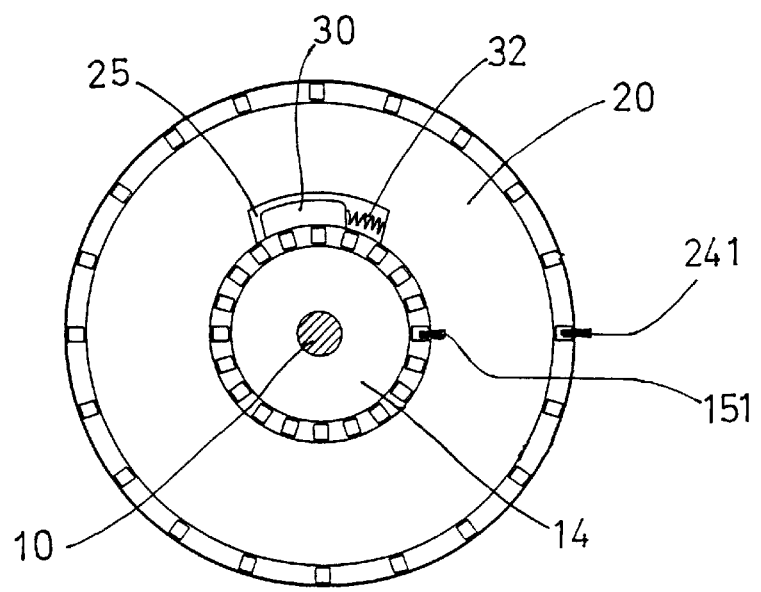

As shown in FIG. 11, the follower 14 and the sprocket 20 may each include a number of light detecting slots 151, 241 provided on or around the outer peripheral portion for allowing the angular displacement between the follower 14 and the sprocket 20 to be detected and sent to the processor device 40.

The sprockets 17, 20 may also be the pulleys or rotary members 17, 20 and coupled together with a belt 23, such that the rotary member 17 may also be driven by the other rotary member 20 with the belt 23.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A detecting device for a cycle, said detecting device comprising:

a shaft, a rotary member rotatably secured onto said shaft, said shaft including means for actuating said rotary member to rotate relative to said shaft, and means for detecting an angular displacement between said shaft and said rotary member.

2. The detecting device according to claim 1, wherein said actuating means includes an actuator rotatably and unidirectionally secured on said shaft, and engageable with said rotary member for rotating said rotary member relative to said shaft.

3. The detecting device according to claim 2, wherein said rotary member includes a cavity formed therein for receiving said actuator.

4. The detecting device according to claim 2 further comprising a spring engaged between said actuator and said rotary member.

5. The detecting device according to claim 1, wherein said detecting means includes a first sensor disposed on said rotary member, and a second sensor attached to said shaft.

6. The detecting device according to claim 5, wherein said shaft includes a follower secured thereon for supporting said second sensor.

* * * * *